Figure 1:
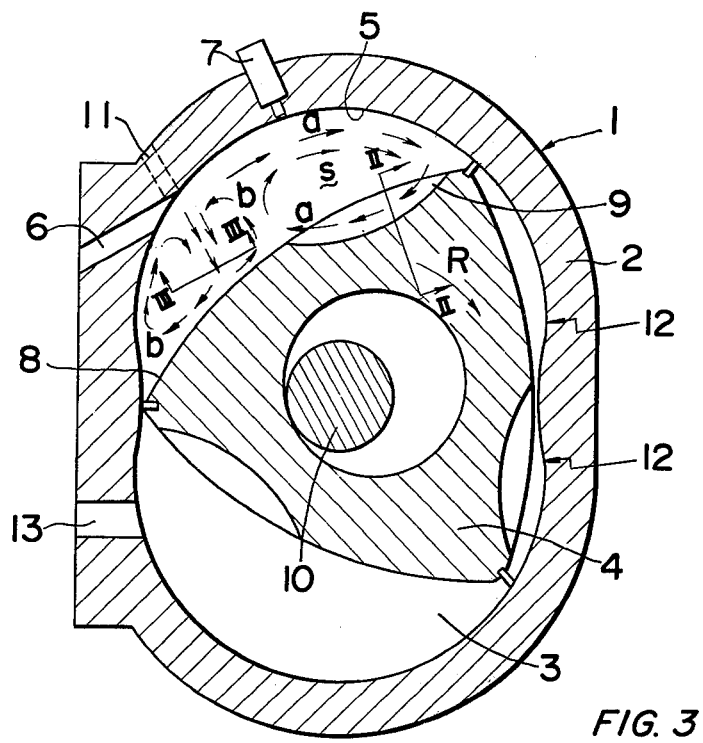

United States Patent [19]
Shimoji et al.

[11] 3,889,643
[45] June 17, 1975

[54] FUEL INJECTION-TYPE ROTARY PISTON ENGINE

[75] Inventors: Masaharu Shimoji; Haruhiko Satow; Tetsuo Kawano, all of Hiroshima, Japan

[73] Assignee: Toyo Kogyo Co., Ltd., Hiroshima, Japan

[22] Filed: Apr. 25, 1974

[21] Appl. No.: 464,616

[30] Foreign Application Priority Data
Apr. 30, 1973  Japan .............................. 48-48680

[52] U.S. Cl. .............................................. 123/8.09
[51] Int. Cl. ............................................. F02b 53/10
[58] Field of Search ................ 123/8.09, 8.11, 8.13

[56] References Cited
UNITED STATES PATENTS
3,688,748  9/1972  Lamm .............................. 123/8.09

FOREIGN PATENTS OR APPLICATIONS
1,145,432  3/1963  Germany .......................... 123/8.09
2,026,211  12/1971  Germany .......................... 123/8.09

*Primary Examiner*—William L. Freeh
*Assistant Examiner*—Michael Koczo, Jr.
*Attorney, Agent, or Firm*—Wenderoth, Lind & Ponack

[57] ABSTRACT

A rotary piston internal combustion engine of a type wherein a fuel injection system including a fuel injection nozzle is provided for injecting fuel into the working chamber under suction process. Within the suction chamber, the injected fuel is present in atomized form mixed with combustion air fed through an intake passage formed in a peripheral wall of the engine housing structure. Stratification of the charge within the suction chamber is advantageously achieved by creating a circulating or swirling flow in the combustion chamber that takes place in the leading portion of the suction chamber with respect to the rotational direction of a three-lobed rotor.

5 Claims, 5 Drawing Figures

PATENTED JUN 17 1975  3,889,643

FUEL INJECTION-TYPE ROTARY PISTON ENGINE

The present invention generally relates to a rotary piston internal combustion engine and, more particularly, to a rotary piston internal combustion engine of a type wherein a fuel injection system including a fuel injection nozzle is provided for injecting fuel into the working chamber under a suction process through the injection nozzle thereby creating a stratification of rich and lean air-fuel mixture.

As is well understood by those skilled in the art, the rotary piston internal combustion engine comprises a rotor housing composed of a peripheral wall having therein a substantially trochoidally shaped inner surface and a pair of side walls secured to both sides or ends of the peripheral wall. A typically three-cornered rotor is housed within the rotor housing for eccentrical movement with its apex portions in sliding engagement with the trochoidally shaped inner surface through respective apex seals, which eccentric movement produces the power output of the engine through a main shaft carrying the rotor thereon. The rotor within the rotor housing divides the interior of the rotor housing into a plurality of working chambers defined by the trochoidally shaped inner surface of the peripheral wall, opposed inner surfaces of the side walls and flanks of the rotor, each of the working chambers varying in volume during eccentric rotation of the rotor.

Because of variations in the volume of each of the working chambers during the eccentric rotation of the rotor, it has been found that a circulating flow of air or air-fuel mixture that has been sucked into the working chamber under a suction process is barely created within such working chamber.

As a rotary piston internal combustion engine developed with a view to more or less eliminating the foregoing disadvantage, one equipped with the fuel injection system is known wherein air sucked into the working chamber under suction is designed to flow towards the leading side of the rotor with respect to the direction of rotation of the rotor along one of the rotor flanks that is exposed to the working chamber under suction and then to flow back toward the trailing side of the rotor along the trochoidally shaped inner surface of the peripheral wall.

In this type of rotary piston internal combustion engine, during the first half of the suction process, the air sucked into the working chamber immediately collides against the rotor flank to an extent that the kinetic energy of the air flowing within the working chamber is considerably reduced, because the relative space between a suction port and the rotor flank is quite small. Moreover, even when the suction process is further advanced with the rotor rotating in such a way as to lengthen the relative space between the suction port and the rotor flank, the sucked-in air and/or fuel-injected air-fuel mixture collide against the rotor flank at an angle different from that during the first half of the suction process. Therefore, it has been found that the air and/or fuel-injected air-fuel mixture in the working chamber under suction process are subjected to an eddying motion or turbulence, far from achieving a satisfactory circulating flow.

Accordingly, an essential object of the present invention is to provide an improved rotary piston internal combustion engine of the type referred to above, which efficiently operates with substantial elimination of the above described disadvantage still left unsolved in the known rotary piston internal combustion engine.

Another important object of the present invention is to provide an improved rotary piston internal combustion engine of the type referred to above, wherein the stratification of the charge introduced into the working chamber under the suction process is advantageously preserved from the working chamber under suction process up to the working chamber under combustion process so that the rich mixture is ignited by the spark plug and the lean mixture is ignited by the previously ignited rich mixture.

To this end, according to the present invention, there is provided an improved fuel injection type rotary piston internal combustion engine wherein a portion of the trochoidally shaped inner surface of the peripheral wall which has a relatively great curvature is utilized to control the flow of air or the air-fuel mixture in the working chamber and, in addition thereto, rotor cavities formed in the rotor and inwardly recessed from the respective rotor flanks are displaced in the leading side of the corresponding rotor flanks, with respect to the rotational direct of the rotor. By this arrangement, the charge, consisting of air or an air-fuel mixture, introduced into the working chamber can advantageously flow in a substantially circulating or swirling pattern at a leading portion of the suction or compression chamber with respect to the rotational direction of the rotor, without the kinetic energy thereof being reduced. Even though the charge circulates or swirls as hereinabove described, the stratification of rich and lean mixture can be preserved so that, during the combustion process, the rich portion of the charge is ignited by the spark plug and the lead portion of the same is ignited by the flame in the previsouly ignited mixture.

It is to be noted that the portion of the inner surface of the peripheral wall which has a relatively great curvature locates around the point where the major axis, drawn through the widest part of the substantially kidney-shaped epicycloid which represents the cross section of the peripheral wall, intersects the trochoidally shaped inner surface.

Figure 2:
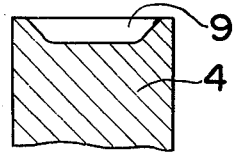
Figure 3:
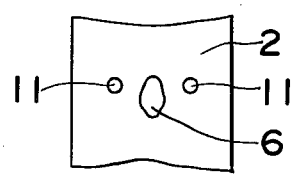
Figure 4:
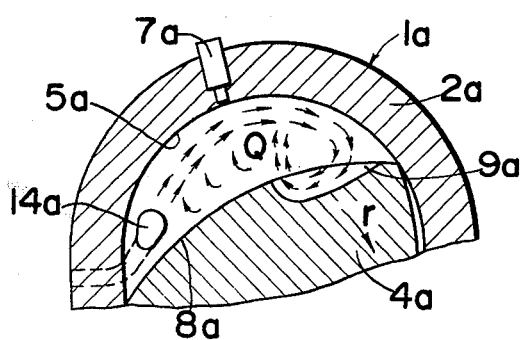
Figure 5:
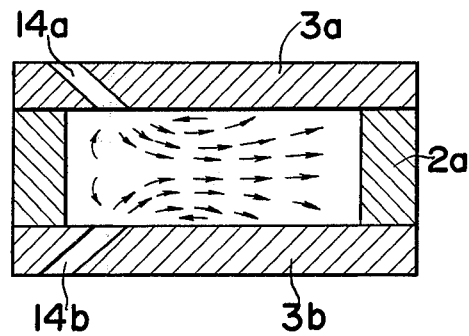

These and other objects and features of the present invention will become apparent from the following description taken in conjunction with preferred embodiments thereof with reference to the accompanying drawings, in which;

FIG. 1 is a schematic cross-sectional view of a fuel injection-type rotary piston internal combustion engine embodying the present invention, FIG. 2 is a cross-sectional view of a portion of a rotor, that is taken along the line II—II in FIG. 1, FIG. 3 is a plane view of a portion of the inner surface of the peripheral wall, showing relative positioning of a suction port and a pair of auxiliary air intake ports, FIG. 4 is a schematic cross-sectional view of a portion of the fuel injection-type rotary piston internal combustion engine that is practising another embodiment of the present invention, and FIG. 5 is a schematic sectional view of the engine working chamber of the engine shown in FIG. 4, illustrating a relationship between the arrangement of the suction ports and the flow pattern of the charge introduced into the working chamber.

Before the description of the present invention proceeds, it should be noted that like parts are designated by like reference numerals throughout the several views of the accompanying drawings.

Referring first to FIGS. 1 to 3, the rotary piston engine shown therein employs a peripheral port system wherein a pair of spaced intake and exhaust passages 6 and 13 are formed in a peripheral wall 2 having a substantially epitrochoidally shaped inner surface 5. The peripheral wall 2 forms an engine housing structure 1 together with a pair of spaced side walls, only one of which is shown by 3 and which are secured to both ends of the peripheral wall 2 in any known manner.

A rotor 4 is housed within the housing structure 1 and mounted on a power output shaft 10 in any known manner for eccentric rotation about the axis of the shaft 10 with its apex portions and side faces respectively in sliding engagement with the inner surface 5 of the peripheral wall 2 and the opposed inside surfaces of the side walls 3. A pair of spaced leading and trailing ignition plugs are carried by the peripheral wall 2 as indicated by numerals 12.

The construction and operation of the rotary piston internal combustion engine so far described is disclosed in numerous publications including patent specifications and well understood by those skilled in the art and, therefore, the details thereof are herein omitted for the sake of brevity.

However, according to the present invention, as best shown in FIG. 1, the intake passage 6 opening into a working chamber S that is defined by one of rotor flanks 8 of the rotor 4, the side walls 3 and a corresponding portion of the inner surface 5 and which is conditioned under a suction process by the position of the rotor 4, is inclined towards the rotational direction R of the rotor 4 at an angle so selected as will be described later. It is to be noted that, on each of the rotor flanks 8, a rotor cavity 9 of substantially arch-shaped configuration having a cross section of such a shape as shown in FIG. 2 is formed and the position thereof is displaced at the leading side of the rotor flank 8 with respective to the rotational direction of the rotor 4.

A fuel injection nozzle 7 leading from a source of fuel (not shown) extends through the peripheral wall 3 in a known manner and opens towards the working chamber S for injection of fuel thereinto.

For the purpose as will become clear from the subsequent description, auxiliary air supply passage 11 may be formed in the peripheral wall 2 so as to extend substantially orthogonally to the intake passage 6, individual openings of these passages 11 being located substantially on both sides of the opening of the intake passage 6 on the inner surface 5 as shown in FIG. 3.

With the foregoing arrangement, the angle of inclination of the intake passage 6 relative to the peripheral wall 2 is selected such that air entering the suction chamber S through the passage 6 is first directed towards that portion of the inner surface 5 adjacent the point where the major axis intersects the inner surface 5, then guided along the inner surface towards the leading side of the working chamber S with respect to the rotational direction of the rotor 4, and finally flows back towards the inner surface 5 along the bottom of the rotor cavity 9, joining the subsequent flow of air that has been continuously introduced into the chamber S during the suction process, substantially as shown by arrow-headed broken lines a in FIG. 1. In practice, while the combustion air thus introduced flows within the chamber S in the manner as hereinbefore described, fuel is also injected directly into the chamber S through the injection nozzle 7 at a suitably selected angle of injection and under suitably controlled pressure. This fuel thus injected impinges against the flow of the combustion air that has been introduced into the chamber S through the intake passage 6, mixes with such combustion air and finally circulates guided by the flow of the combustion air at the leading side of the chamber S without substantially travelling towards the trailing side of the chamber S.

It is to be noted that, at the time the front of the combustion air flowing back towards the subsequent flow of the same along the bottom of the rotor cavity 9 is to join such subsequent flow, the velocity of flow of the combustion air front has become somewhat lower than the velocity of the subsequent flow and, therefore, the combustion air front joins the subsequent flow in such a substantial manner as to be sucked or drawn in the subsequent flow, thereby establishing a substantially circulating or swirling flow pattern at the leading side of the chamber S.

Therefore, it is clear that, at the time of completion of the suction process that is created by the working chamber S varying in volume as the rotor 4 rotates in the direction R, the charge within the working chamber 4 is stratified into a rich mixture present at the leading side thereof and a lean mixture present at the trailing side thereof so that, during the subsequent combustion process, the rich mixture can be first ignited by the ignition plug and the lean mixture can be ignited by the flame generated by the previously ignited rich mixture.

The stratification of the charge in the manner as hereinbefore described is particularly required when the engine is driven under low load operation and, though the peripheral port system wherein the suction passage 6 is formed in the peripheral wall 2 is suitable for the stratification, it is preferred to make the opening of the suction passage 6 on the inner surface 5 have a relatively small surface area. However, since the rotary engine when, for example, used in an automotive vehicle is not always driven under low load condition, additional suction means through which combustion air is introduced during high load operation of the engine may be provided in combination with the suction passage 6. The additional suction means hereinabove referred to may be in the form of known side ports that are respectively formed in the side walls of the engine housing structure.

The auxiliary air supply passages 11 which may be omitted as desired are, if employed, provided for forming what may be called an air curtain at the trailing side of the working chamber S. In other words, streams of air emerging from the respective passages 11 situated on both sides of the suction passage 6 are first directed towards the rotor flank without crossing the air stream emerging from the passage 6, impinging against the rotor flank 8 in such a manner as indicated by arrow-headed broken lines b in FIG. 1. Thereafter, the air streams from the auxiliary air supply passages 11 flow in part toward the trailing side of the chamber S and in part toward the leading side of the same without substantially interferring with the backward flow of the combustion air or air-fuel mixture that is present at the leading side of the chamber S. The so-called air curtain created by the supply of air through the passages 11 acts to confine the rich mixture within a zone in the leading side of the working chamber S so that the stratification of the charge is well preserved substantially during the suction process.

Referring now to FIGS. 4 and 5, the rotary piston internal combustion engine shown therein employs a side port system wherein suction passages 14a are formed in the respective side walls 3a. These suction passages 14a are inclined relative to the respective side walls 3a at such an angle as to permit streams of air emerging from these passages 14a to flow in a direction substantially parallel to the rotational direction of the rotor 4a and concurrently to cross each other or be directed against each other thereby impinging against each other above and substantially intermediate of the rotor flank 8a as shown by arrow-headed broken lines in FIG. 5. The impinged air streams further flow along the inner surface 5a towards the leading side of the chamber S in such a manner as indicated by arrow-headed broken lines in FIG. 4 and then flow backwards along the bottom of the rotor flank 9a in a substantially similar manner as hereinbefore described with reference to FIG. 1.

This is possible not only because the passages 14a are so inclined relative to the respective side walls 3a as to extend in the direction substantially parallel to the rotational direction of the rotor 4a, but also because portions of the passages 14a adjacent their openings on the inner surface 5a are respectively oriented toward that portion of the inner surface 5a around the point where the major axis intersects the inner surface 5a, i.e., the portion of the inner surface 5a which has a relatively great curvature.

It should be noted that each of the rotor cavities 9a employed in the embodiment of FIGS. 4 and 5 is also displaced in position in a similar manner as the rotor cavity 9 employed in the embodiment of FIGS. 1 to 3, but is in the form having maximum depth in the trailing portion of the cavity 9a and having a configuration where, with respect to the rotational direction of the rotor 4a, a curvature of the leading portion of the cavity 9a is much larger than that of the trailing portion thereof. It is further to be noted that the shape of each of the rotor cavities is not always limited to that shown in either FIGS. 1 to 3 and FIGS. 4 and 5, but may be of any other shape so far as it is formed in the rotor 4 at the leading side of the working chamber. By way of example, the rotor cavity 9 chown in FIGS. 1 to 3 can be equally applicable in the embodiment of FIGS. 4 and 5 while the rotor cavity 9a shown in FIGS. 4 and 5 can be also equally applicable in the embodiment of FIGS. 1 to 3. Also, a maximum depth in the rotor cavity 9 may be formed in the leading portion in place of the trailing portion.

Even in the embodiment of FIGS. 4 and 5, the stratification of the charge is well preserved from the suction process up to the combustion process with the working chamber under suction process transferred into the combustion chamber as the rotor 4a rotates.

From the foregoing full description of the present invention, it has now become clear that, with the arrangement of either of the embodiments, stratification of the charge can be effectively carried out in the working chamber under suction process, which ultimately contributes to reduction of the unburned noxious compounds present in the exhaust gas of the internal combustion engine of the type referred to above.

Although the present invention has been fully described by way of preferred embodiments thereof, it should be noted that various changes and modifications are apparent to those skilled in the art and, therefore, these changes and modifications should be construed as included within the true scope of the present invention unless otherwise they depart therefrom.

What is claimed is:

1. A fuel injection-type rotary piston engine which comprises in combination:

housing wall means including at least one peripheral wall and side walls secured to both ends of said peripheral wall;

inlet means and outlet means operatively positioned for admission of combustion air to and discharge of exhaust gases from said rotary piston engine;

a polygonal rotor means having rotor flanks and rotatably housed within said housing wall means, each of said rotor flanks having a rotor cavity formed therein, said rotor cavity located on the corresponding rotor flank at a position displaced in the direction of rotation of siad polygonal rotor means;

means operatively coupled to said polygonal rotor means for rotating said polygonal rotor means relative to said housing wall means so as to control the opening and closing of said inlet and outlet means directly by the rotary movement of said polygonal rotor means and also to effectively provide, during the rotary movement of said polygonal rotor means, a suction chamber followed by a combustion chamber in the direction of rotation of said polygonal rotor means, said inlet means being so inclined in a direction substantially parallel to the direction of rotation of said polygonal rotor means as to permit the combustion air, that is to be introduced into the suction chamber therethrough, to be directed toward the area within the suction chamber adjacent the point where an imaginary line drawn through the largest part of the interior of said housing wall means substantially intersects the inner surface of the peripheral wall;

ignition plug means in said housing wall means within the area thereof of said combustion chamber; and injection means operatively positioned and including a fuel injection nozzle for injecting fuel into said suction chamber.

2. A rotary piston engine as claimed in claim 1, wherein said inlet means comprises at least one inlet passage formed in said peripheral wall and having one end in communication with a source of combustion air and the other end open towards the suction chamber.

3. A rotary piston engine as claimed in claim 1, wherein said inlet means comprises at least one pair of inlet passages respectively formed in said side walls, each of said inlet passages having one end in communication with a source of combustion air and the other end open towards the suction chamber.

4. A rotary piston engine as claimed in claim 1, further comprising auxiliary air supply means in said housing wall means for, without substantially interfering with the definite flow of the combustion air within said suction chamber, forming an air curtain thereby providing an obstruction to the back flow of said combustion air.

5. A rotary piston engine as claimed in claim 1, wherein said rotor cavity has maximum depth in the trailing portion of the cavity with respect to the direction of rotation of said polygonal rotor means.

* * * * *